(12) United States Patent
Stolboushkin

(10) Patent No.: US 8,082,342 B1
(45) Date of Patent: Dec. 20, 2011

(54) DISCOVERY OF SHORT-TERM AND EMERGING TRENDS IN COMPUTER NETWORK TRAFFIC

(75) Inventor: Alexei Stolboushkin, San Carlos, CA (US)

(73) Assignee: Google Inc., Mountain View, CA (US)

( * ) Notice: Subject to any disclaimer, the term of this patent is extended or adjusted under 35 U.S.C. 154(b) by 838 days.

(21) Appl. No.: 11/616,510

(22) Filed: Dec. 27, 2006

(51) Int. Cl.
*G06F 15/173* (2006.01)
(52) U.S. Cl. ........ 709/224; 709/203; 709/239; 709/249; 707/1; 707/6; 707/10
(58) Field of Classification Search .................. 709/224; 707/3–7; 703/2, 16, 17; 719/318
See application file for complete search history.

(56) References Cited

U.S. PATENT DOCUMENTS

| | | | | |
|---|---|---|---|---|
| 5,850,538 A | * | 12/1998 | Steinman | 703/21 |
| 6,701,459 B2 | * | 3/2004 | Ramanathan et al. | 714/37 |
| 6,779,030 B1 | * | 8/2004 | Dugan et al. | 709/223 |
| 7,061,923 B2 | * | 6/2006 | Dugan et al. | 370/396 |
| 7,089,428 B2 | * | 8/2006 | Farley et al. | 726/22 |
| 7,558,775 B1 | * | 7/2009 | Panigrahy et al. | 707/1 |

OTHER PUBLICATIONS

Ronny Lempel and Sholmo Moran, Predictive caching and prefetching of query results in search engines, '03 Proceedings of the 12th international conference on World Wide Web, May 2003, pp. 19-28.*

\* cited by examiner

*Primary Examiner* — Carl Colin
*Assistant Examiner* — Mohammad Siddiqi
(74) *Attorney, Agent, or Firm* — Mollborn Patents, Inc.; Fredrik Millborn

(57) ABSTRACT

Methods and apparatus, including computer program products, implementing and using techniques for identifying currently dominant events in a computer system. Events in the computer system are monitored. A subset of the monitored events is selected. Priorities are assigned to the events in the subset of monitored events. The priorities are generated through applying a mathematical formula to each event in the subset of events, which mathematical formula discounts old events relative to recent events. A first set of priorities is stored in a first priority queue. The first set of priorities identifies the currently dominant events in the subset of monitored events.

15 Claims, 8 Drawing Sheets

DISCOVERY OF SHORT-TERM AND EMERGING TRENDS IN COMPUTER NETWORK TRAFFIC

BACKGROUND

This invention relates to detecting trends in computer network traffic.

Caching is a technique that is used for various purposes in many areas of computing. Typically, cached data is a copy of data that has already been computed or retrieved and that is likely to be reused at some later point in time, and where re-computing the original data or fetching it from its location is more expensive (usually in terms of access time and computer resources) than reading the copy of the data from the cache.

One field in which caching is commonly used in order to save computer resources and reduce latency is in search engines, such as the Google™ search engine by Google Inc., Mountain View, Calif. By caching search results, it is possible to conduct an original search for a new query, and whenever the same query is made by another user, serve a cached copy of the original search results to that user. This can lead to significant savings in computer resource usage, especially when large numbers of queries are processed on a regular basis.

When large numbers of distinct queries are possible, it can be difficult or impractical to cache all the search results. Thus, it is necessary to make a decision about which search results to cache. In one commonly used method, known as the LRU (least recently used) method, the N last distinct events are cached and any older events are discarded, where N is a number that depends on the type of application and on the available cache space. The term "event" is used herein to refer to any type of activity that can be measured and logged on a computer network. Some examples of events include queries, user selections of hyperlinks, and user selections of advertisements. In another commonly used method, known as a top-value scheme, events are cached based on some kind of prior knowledge. For example, the top N queries seen over a set of days can be cached, hoping that these events will remain the top events in the live traffic.

As the skilled reader realizes, neither of these methods is sufficiently perceptive to short-term trends under certain conditions. Short-term trends are, however, important to consider, as they are often the result of external activities dominating the time of day and date, as well as current events. For example, during the days preceding and following a space shuttle launch there may be many searches relating to "space shuttles," "NASA," "space," and similar terms. Right around the Martin Luther King Holiday, there may be many searches about "Martin Luther King." If a celebrity was just arrested for drunk driving and assaulting a police officer, it is reasonable to expect a significant increase in queries involving the name of that celebrity. Thus, it would be useful to have better methods of detecting short term trends for the purposes of caching search results to making them more readily available to users.

SUMMARY

In general, in one aspect, methods and apparatus, including computer program products, are provided implementing and using techniques for identifying currently dominant events in a computer system. Events in the computer system are monitored. A subset of the monitored events is selected. Priorities are assigned to the events in the subset of monitored events. The priorities are generated through applying a mathematical formula to each event in the subset of events, which mathematical formula discounts old events relative to recent events. A first set of priorities is stored in a first priority queue. The first set of priorities identifies the currently dominant events in the subset of monitored events.

Advantageous implementations can include one or more of the following features. The currently dominant events can be cached in a cache on one or more computers. The computer system can include a network, such as an intranet or the Internet. The events can include queries, advertisement selections, user/client actions. The events can have a client identifier, such as a client IP address, a cookie, or a user identifier. A second set of priorities identifying a set of events that are not currently dominant events can be stored in a second priority queue. The highest priority can be transferred from the second priority queue to the first priority queue when the priority in the second priority queue is higher than the lowest priority in the first priority queue, and the lowest priority can be transferred from the first priority queue to the second priority queue when a priority from the second priority queue is transferred to the first priority queue.

A reverse representation of the priorities in the second priority queue can be stored in a third priority queue, and the reverse representation in the third priority queue can be used for garbage collection of infrequently used priorities in the second priority queue. The mathematical formula can be a linear function, an exponential function, or a polynomial function. The mathematical formula can use times associated with each event to discount older events relative to recent events. The number of events in the subset of events can be in the order of $O(\log N)$, where N is the number of elements in the first priority queue. Each of the storing and assigning the first set of priorities can be an operation of $O(\log N)$, where N is the number of elements in the first priority queue. Each of the storing and assigning the second set of priorities can be an operation of $O(\log N)$, where N is the number of elements in the second priority queue. Each of the storing and assigning the third set of priorities can be an operation of $O(\log N)$, where N is the number of elements in the third priority queue. The first priority queue can be a tree-based implementation or a heap-based implementation. The first priority queue can support operations such as inserting an arbitrary element at any position within the first priority queue, adjusting of the position of an arbitrary element located at any position within the first priority queue, and removing an arbitrary element located at any position within the first priority queue.

The various embodiments can be implemented to include one or more of the following advantages. Better performance is achieved compared to the currently used LRU schemes and top-value schemes described above. The method and apparatus in accordance with various embodiments can be implemented efficiently to perform in real time and with search engine traffic involving large numbers of queries. Quicker adaptation to changing traffic trends and thus a more efficient use of the in-memory cache is achieved, compared to the LRU schemes and top-value schemes described above. The method and apparatus in accordance with various embodiments can be used to supplement other caching methods by in-memory caching of "cream-of-the-crop" queries, which allows a further decrease of response times when users conduct web searches. Other factors can be taken into account in deciding which queries to cache, in addition to current query popularity. For example, some queries may be harder to answer, and these are especially good candidates for caching. The method and apparatus in accordance with various embodiments are easily adaptable to account for such other weight factors.

Search traffic spikes can be alleviated, which leads to a decrease in the overall datacenter load for search engines.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
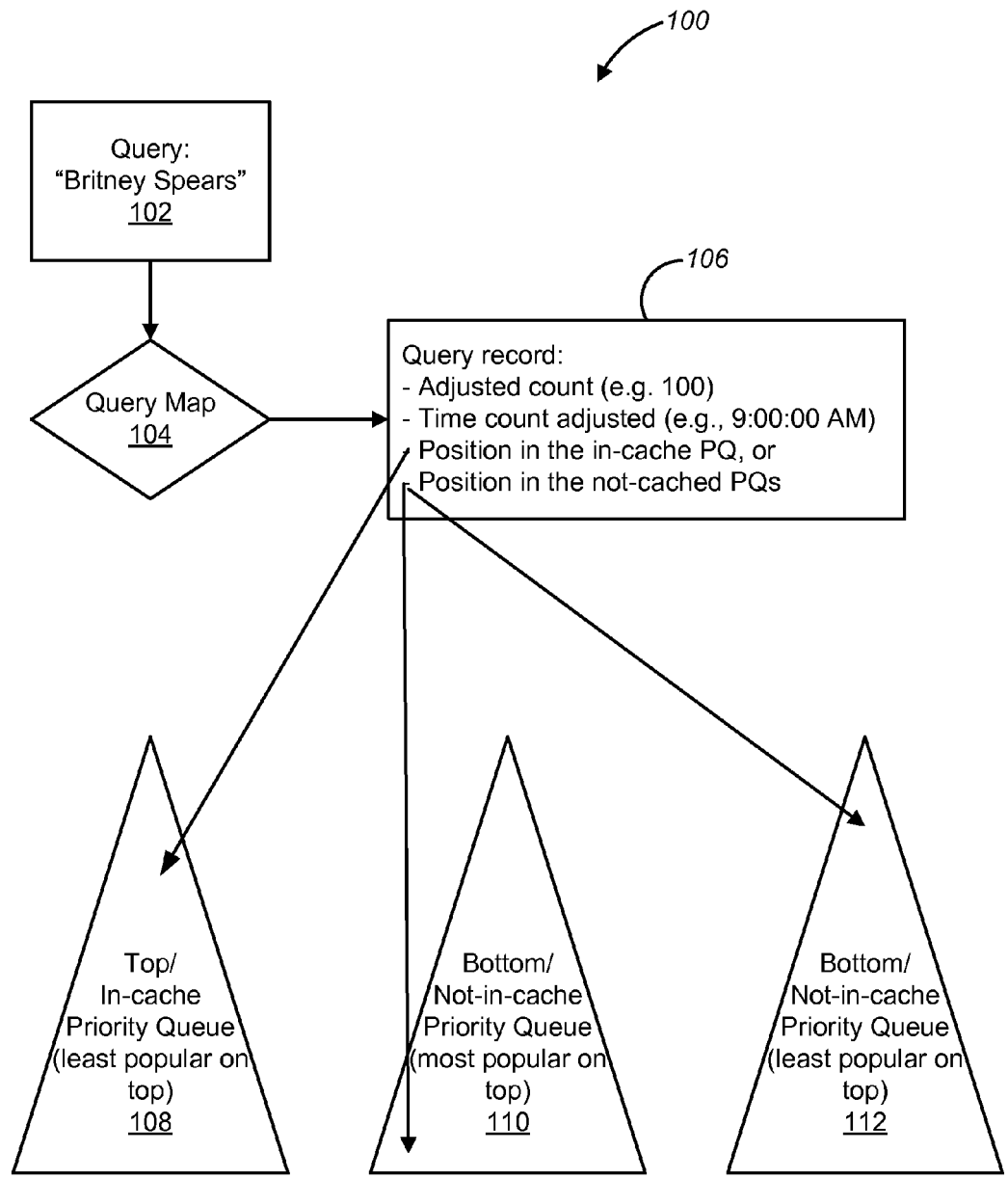
FIG. 1 shows a structure for storing currently dominant queries in accordance with some embodiments.

The present description provides methods and apparatus for dynamically and in real time identifying emerging dominant events in live computer network traffic. The methods and apparatus in accordance with various embodiments dynamically assign higher priorities to recent events compared to past events, and then summarize the top events in accordance with these dynamically determined priorities.

In order to achieve this, various embodiments employ a discounting mathematical formula, a lazy discounting that applies the discounting mathematical formula to only a few events on the computer network, a set of priority queues, and a garbage collection method. The discounting mathematical formula assigns priorities to events based on how often and when the events occurred. The discounting mathematical formula discounts old occurrences relative to recent occurrences. The lazy discounting enables the discounting mathematical formula to be applied only to a few events, rather than all tracked events, while encountering and processing a new live-traffic event. This is useful for performance reasons, as it may be practically impossible to apply the mathematical discounting formula to every event when there are large numbers of events going on, and at the same time maintain the real-time functioning of the system and methods.

The priority queues that are used in various embodiments can be based on conventional priority queues that are well known to those of ordinary skill in the art. However, the priority queues used in the various embodiments allow for changing the priority of an arbitrary queue element at any moment, removal of any element from the priority queue, and keeping track of the actual position of any element in the queue, while still preserving O(log N) timing for all the operations, where N is the number of elements in the queue. For instance, when an element is removed from a priority queue, the element's position is obtained, and after the element has been removed, the last element from the priority queue is moved into this position. As will be realized by those of ordinary skill in the art, this newly inserted element can then be promoted to a correct position in the priority queue by first pushing the element up the queue, and then pushing the element down the queue. Adjustment of the priority of an arbitrary element, including how position references in the elements are kept current, will be discussed in detail below with reference to FIG. 6. Finally, the garbage collection method prevents the system from overflowing by "rare" events.

The interactions between these components in various embodiments will now be discussed in greater detail, by way of example, with reference to queries submitted to a search engine and for the purpose of caching currently dominant search results, such that the search results can be presented to users in a more efficient way. The term "dominant search results" is used herein to refer to results of the currently "most popular" searches, that is, queries that are entered by many users over a short time period and account for a disproportionately large share of current traffic. It is also a representative example of a "currently dominant event."

System Overview

FIG. 1 shows a system that can be implemented on a computer for storing currently dominant queries in accordance with some embodiments. As shown in FIG. 1, whenever a query (102) comes in, the query (102) is checked against a query map (104) to a set of query records in order to determine whether there is already an existing query record (106) for the query (102), that is, whether the query is already known to the system and is being tracked. The query map (104) can be implemented in a variety of ways that are well known to those of ordinary skill in the art, such as balanced trees, hashes, and so on.

In some embodiments, the query record (106) contains information about an adjusted count, which is a number indicating how "popular" the query (102) is at the moment. The methodology for determining the adjusted count will be described below with reference to FIG. 5. The query record (106) also contains a timestamp for when the count was adjusted, as well as a reference to one or more priority queues (108; 110; 112).

The first priority queue (108), also referred to herein as the top/in-cache priority queue, contains elements corresponding to the currently most popular queries, which are stored in cache, and is organized with the least popular element on top. The second priority queue (110), also referred to herein as the not-in-cache priority queue, contains queries that are not the currently most popular ones, and which are not stored in cache, and is organized with the most popular element on top. The third priority queue (112), also referred to herein as the not-in-cache priority queue, contains the same elements as the second priority queue (110), but is organized with the least popular element on top, and is used for garbage collection to make sure that the second priority queue (110) and the query map (104) do not grow too large with infrequently used elements, as will be described in greater detail below with reference to FIG. 8.

In the embodiments that are described herein, the priority queues are heap-based implementations. However, as the skilled person realizes, other implementations can also be used, such as tree-based implementations, or balanced-tree implementations. The balanced-tree implementations can be inferior to the partially-ordered tree implementations, but still within the efficiency constraints required for real time processing. The priority queues (108; 110; 112) will be described in greater detail below.

In the embodiments described herein, for the sake of clarity, logic covering actual caching is not described. As will be realized by those of ordinary skill in the art, once the queries subject to caching have been identified, the actual caching of the respective search results can be achieved by various industry-standard methods, such as, by creating another map that maps queries subject to caching to the actual search results computed by the search engine.

Further, in the embodiments described herein, also for the sake of clarity, issues pertaining to currency or staleness of cached data will not be described. As will be realized by those of ordinary skill in the art, currency of cached data presents a separate dimension to the caching problem, and specific applications can employ various cache drop policies. By way of example, there may be a cache drop policy that requires dropping cached data every two minutes. Thus, a query can be continuously identified as a "dominant query" and subject to caching, and yet the actual cached search results for this query will be dropped and recalculated again every two minutes.

Finally, as will be realized by those of ordinary skill in the art, there is a necessary delay between the moment at which a query is identified as "dominant" and subject to caching, and the moment at which the search results for this query get into the actual cache. Therefore, the top/in-cache priority queue (108) reflects the queries identified as subject to caching. However, at any moment the actual cache contents may be lacking a few results that are still being calculated.

Processing an Incoming Query

Figure 2:
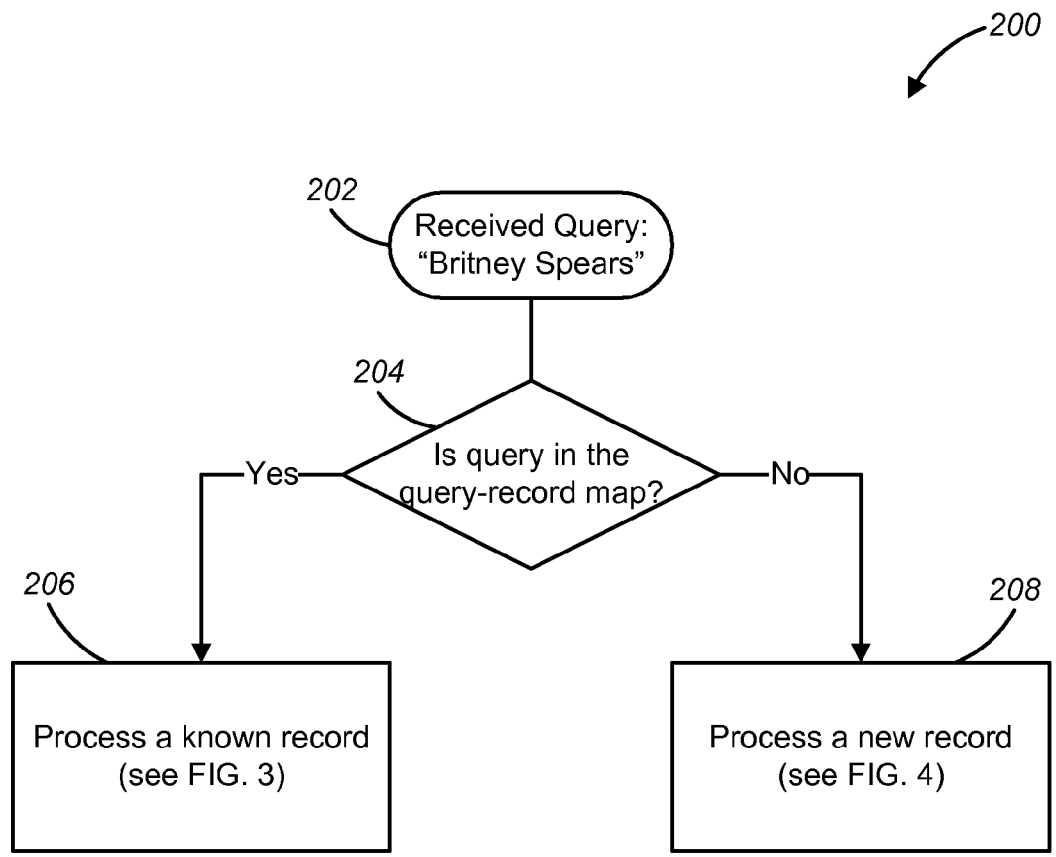
FIG. 2 is a flowchart showing how a query is processed in accordance with some embodiments.

The interaction between the incoming query (102), the map to the query record (104), the query record (106) and the three priority queues (108; 110; 112) will now be explained in the context of FIG. 2. As a result of this interaction, the process returns an indicator as to whether the query is "dominant" and subject to caching. This indicator can be Boolean, but for the sake of clarity the indicator will be identified herein as either "Dominant" or "not Dominant". As can be seen in FIG. 2, in a process (200) in accordance with one embodiment, a query for "Britney Spears" (102) is received (step 202). The process then checks in the query map (104) whether a query record (106) for "Britney Spears" already exists (step 204). If the query record (106) exists, the process branches to step 206 to process a known record, which is illustrated in greater detail in FIG. 3. If the query record does not exist, the process branches to step 208, and processes a new record, which is illustrated in greater detail in FIG. 4. Each of steps 206 and 208 will now be described, starting with the processing of a known record (step 206).

Processing and Adjusting a Known Record

Figure 3:
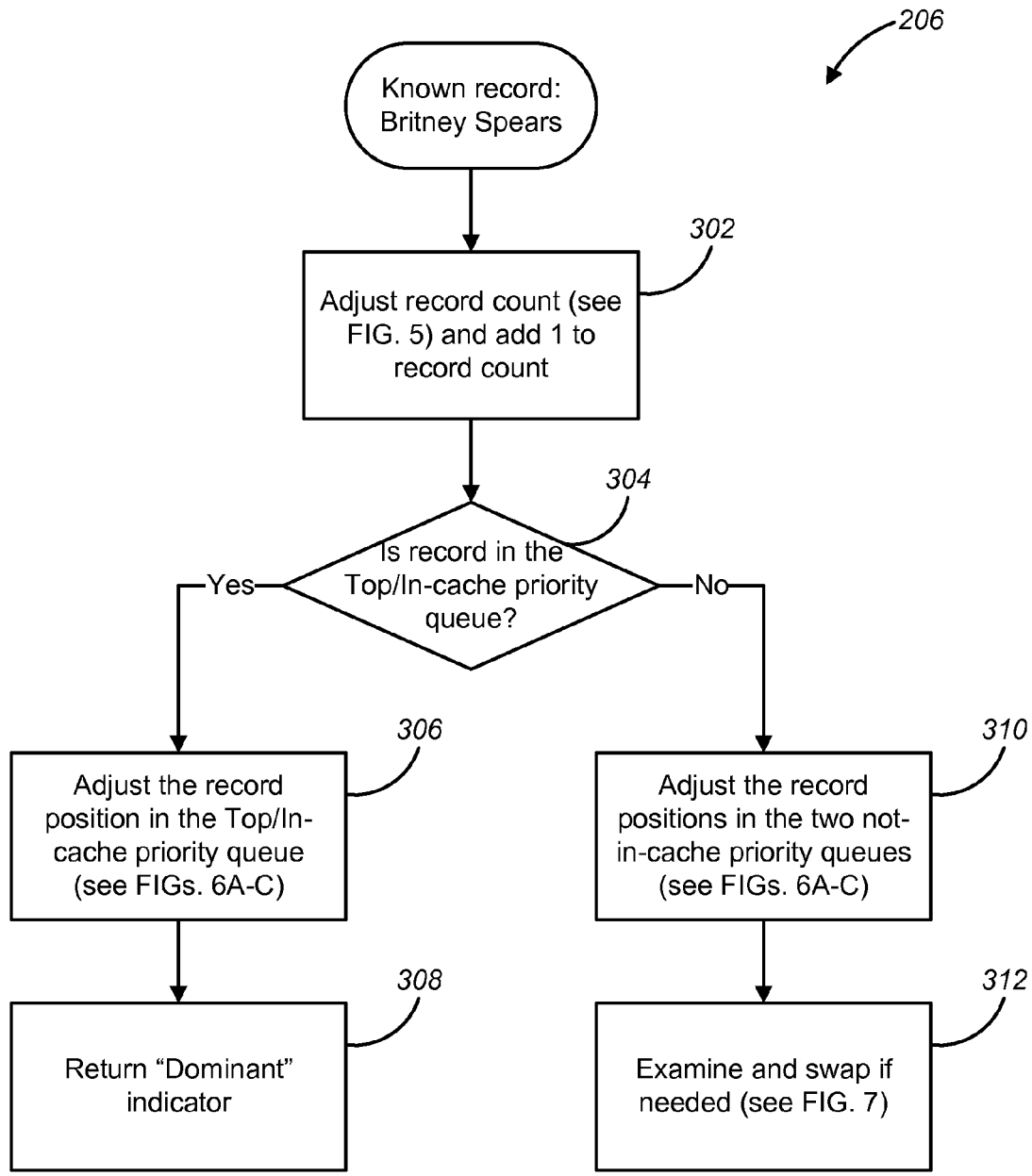
FIG. 3 is a flowchart showing how a known record is processed in accordance with some embodiments.
Figure 5:
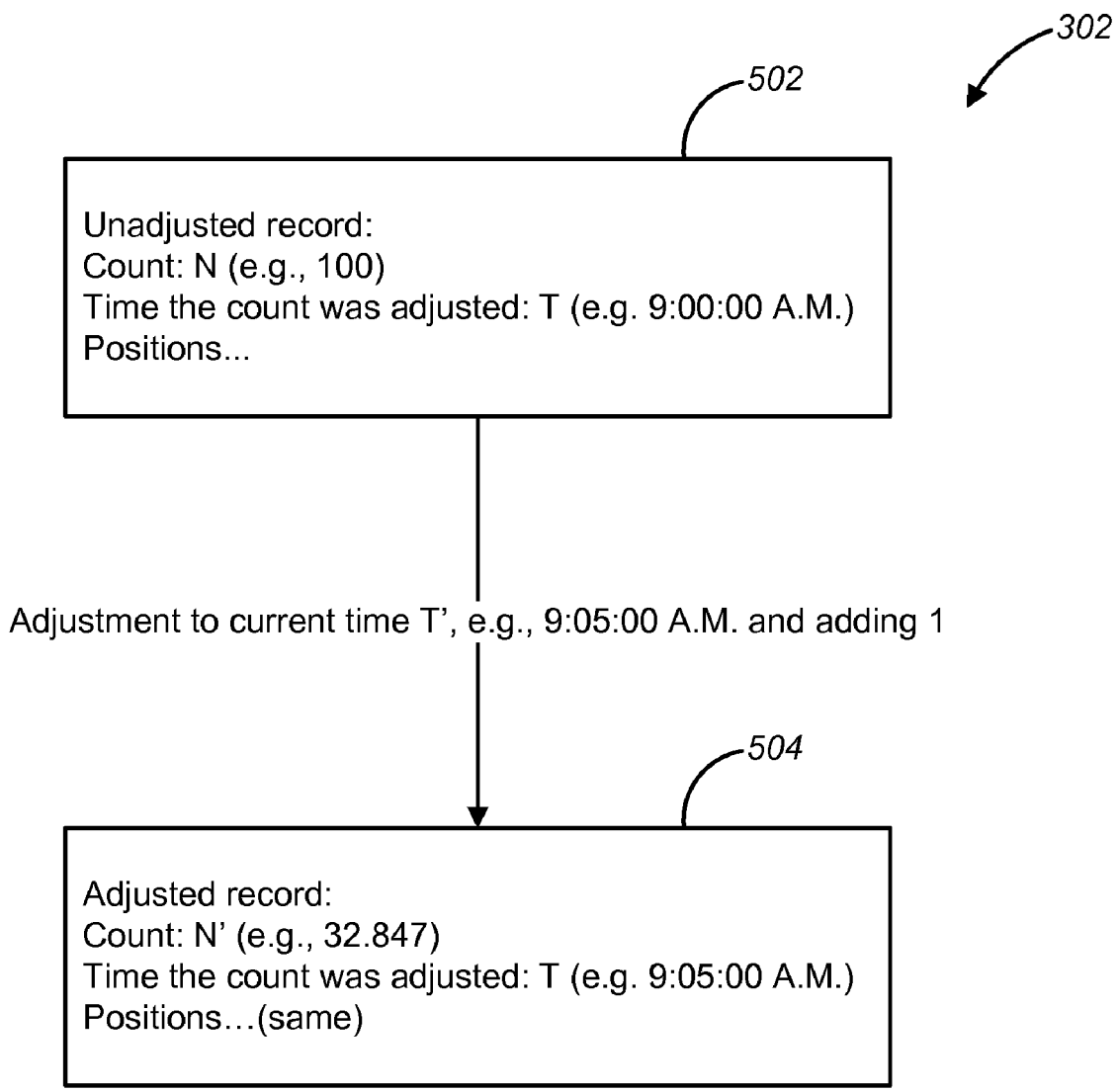
FIG. 5 shows schematically how a record priority is adjusted from an old time value to a current time value in accordance with some embodiments.

As can be seen in FIG. 3, when a known record is received, the process adjusts the record count and adds "1" to the record count (step 302). It should, however, be noted that any number larger than zero could be used, if so desired. This adjustment is done by applying a mathematical formula, and is schematically shown in FIG. 5. As can be seen in FIG. 5, the original, unadjusted record (502) for "Britney Spears" has a count N, for example, 100, and a timestamp showing the time T that the count was last adjusted, for example, 9:00:00 A.M. The record also contains the positions in one or more of the priority queues (108; 110; 112). However, these positions will be temporarily unaffected by the adjustment of the count.

When the new query comes in, five minutes have passed, so the new time is T', that is, 9:05:00 A.M. In order to account for the five minutes that have passed since the record (502) was last adjusted, the count is adjusted from N to N' using the time difference between T' and T and a discounting mathematical formula. In one embodiment, the count is adjusted in accordance with the following discounting mathematical formula:

$$N'=N/Df^{(T'-T)/Ti}$$

where Ti is a discount-time interval, for example, 5 minutes and Df is a discount factor that is applied after time Ti, for example, 3.1415926. That is, if T'−T is 5 minutes, the count will be discounted by a factor 3.1415926. However, if 10 minutes had passed since the last discounting, the discounting would be with a factor 9.8696, and if only 1 minute had passed since the last discounting, the discounting factor would be 1.2573, and so on. Finally, "1" is added to the count to reflect the current query. It should be noted that in most embodiments, as will be discussed in further detail below, the discount factor is not applied to every record every 5 minutes. Rather, the discount factor is only applied when two or more records need to be compared, which is a rare occurrence, relatively speaking.

In the example shown in FIG. 5, the discount time interval Ti is 5 minutes, and the discount factor Df is 3.1415926, so accordingly, in the adjusted record (504) the new count N' becomes 32.847 (that is, 31.847 from the discounting, plus 1). The timestamp in the adjusted record (504) is also updated to reflect the time that the count was adjusted, that is, 9:05:00 A.M. The positions of the record in the priority queues (108; 110; 112) remain the same in the adjusted record (504).

It should be noted that the discounting mathematical formula recited above is merely one example of discounting mathematical formulas that can be used in accordance with the various embodiments. In other embodiments, instead of discounting the old count using the above discounting mathematical formula when determining the current count, the old count can be kept stable and the increment can instead be inflated, using a similar formula. One example of such a formula is:

$$N'=N+Df^{(T'-T0)/Ti}$$

where T0 is the time the system started, and the other variables are defined as above. This implementation is fully symmetrical and equivalent to the one described above in the sense that both implementations provide the same records in the same positions if they are run under the same conditions. A potential downside with the second implementation, however, is that eventually there will be an overflow of the increment in any computer implementation of the method.

Other discounting mathematical formulas can also be used for the same purposes. For example, the discounting described above is exponential in time. In other embodiments, various formulas can be used that emphasize recent events in an exponential or polynomial fashion, and so on. With appropriately selected parameters, such formulas can prove to be substantially and practically equivalent to the above-recited formulas in determining the same set of currently dominant events.

Returning now to FIG. 3, next the process checks whether the record (106) currently is in the top/in-cache priority queue (108) (step 304), by checking the position information contained within the record (106). If the record is in the top/in-cache priority queue (108), the process adjusts the record position within the top/in-cache priority queue (108) based on the new count that was determined for the record (504) (step 306). This adjustment will now be explained with reference to FIGS. 6A-6C. It should be noted that FIGS. 6A-6C for the purposes of easy understanding show a priority queue where the records with the highest counts are on top, as is the case for the second priority queue (110). However, as will be realized by those of ordinary skill in the art, the methodology that will be described for adjusting record positions with reference to FIGS. 6A-6C applies equally well to the reversely ordered priority queues (108; 112), with the modification that the lowest elements are on top of the priority queues (108; 112).

Figure 6A:
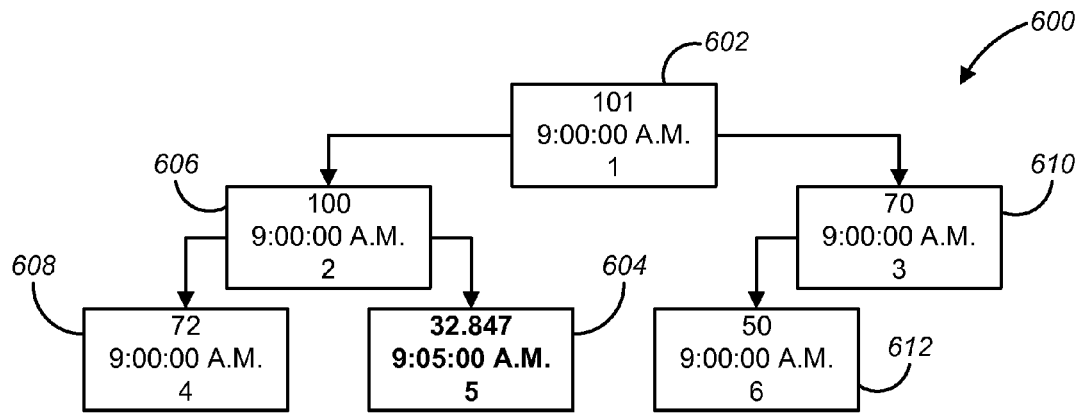
FIGS. 6A-6C show schematically an example of how a priority queue is adjusted when a mathematical formula is applied to the priorities in the priority queue in accordance with some embodiments.

FIG. 6A, shows a priority queue (600) with the highest-priority element (602) on top. Initially this priority queue (600) was partially ordered at 9:00:00 AM, and then the count of the middle element (604) in the bottom row was adjusted, as described above and is now 32.847 as of 9:05:00 AM. Although 32.847 is less than 100 (the count of the parent (606)), the queue is potentially out-of-order, because the order is time-sensitive, so the order of the elements needs to be adjusted as follows.

Figure 6B:
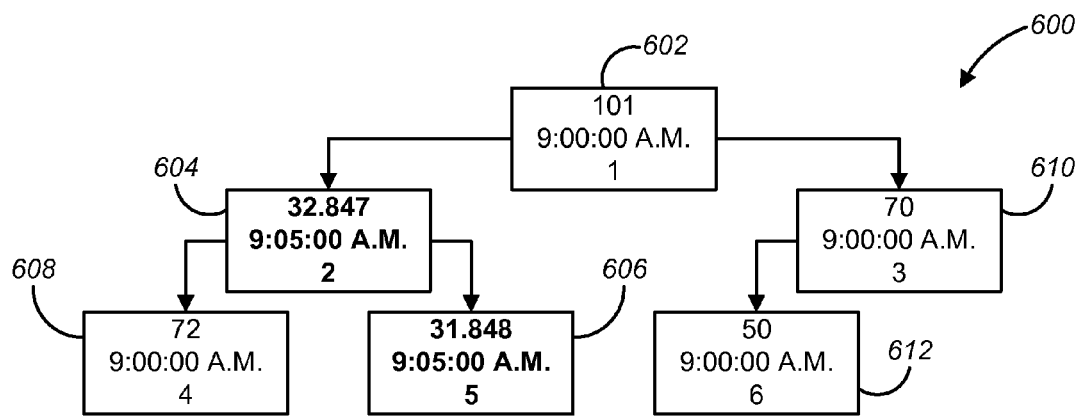

First, the count of the parent element (606) is adjusted from 100 as of 9:00:00 A.M. To 31.848 as of 9:05:00 A.M., using the current time 9:05:00 A.M. and the discounting mathematical formula described above. Now that the counts for both elements have been adjusted to the current time, the elements are out of order (as the parent's count (606) is less than the child (604)). Therefore, the parent element (606), and the child element (604) are swapped, as illustrated in FIG. 6B. It should be noted that as the parent element (606) and child element (604) are swapped, the elements' respective positions in the priority queue are exchanged as well. Thus, in FIG. 6A, the position of the child element (604) was 5 and the position of the parent element (606) was 2. After the swap, in FIG. 6B, the position of the former child element (604) is 2, and the position of the former parent element (606) is 5. It should also be noted that the query records (106) keep three distinct positions that reflect references to three priority queues. Whenever a specific priority queue is modified by swapping, inserting, or deleting an element, the query record (106) modifies the element's position for this priority queue.

It should be noted that it is not necessary to check whether the moved element (604) is greater than the left child element (608), since this is guaranteed to be true as the left child (608) was smaller than the old parent (606). Indeed, if the left child (608) were adjusted to current time, 9:05:00 A.M., its count would change from 72 to 72/3.14=22.93, which is less than 32.847.

Figure 6C:
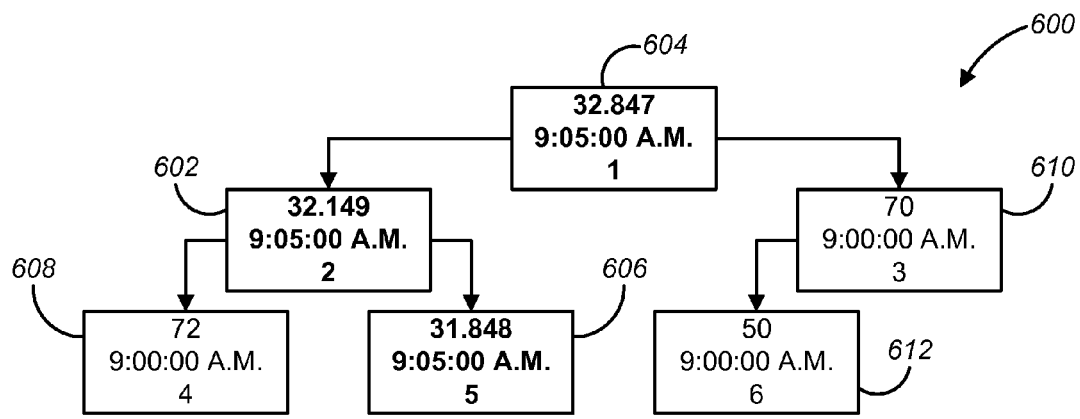

The only potential for the queue (600) to be out of order now is between the moved element (604) and the top element (602). In order to check this, the count for the top element (602) is adjusted to current time 9:05:00 A.M., resulting in a new count of 32.149. Indeed, this is out of order, so the top element (602) and the recently moved element (604) are swapped, which results in the queue structure shown in FIG. 6C. It should be noted that the position references in the two swapped elements were, again, exchanged in FIG. 6C compared to FIG. 6B, reflecting the element swap. This finishes the priority queue adjustment.

This priority queue (600) is now guaranteed to be in the correct order, even though the three remaining queue elements (608; 610; 612) have not been adjusted based on the current time, 9:05:00 A.M. Indeed, if all the elements in the priority queue (600) were adjusted to current time, the numbers would still be in order. This illustrates what is referred to herein as a "lazy queue adjustment" where, in the worst case, only log(N) elements in the queue of size N (one branch of the tree) have to be adjusted. This is important, as in real-time computer network traffic these priority queues can quickly grow to contain a large number of elements and subsequently remain at about this size as the clean-up policy starts regulating the size. If the adjustment had not been made lazily, the mathematical discounting formula would have had to be applied to more elements, which would be more expensive.

For example, with the lazy queue adjustment in a priority queue of about 3 million elements, log(3,000,000) is about 22 (binary logarithm), so when processing a new query, the counts of only a few dozen elements are adjusted (that is, potentially 22 adjustments in each of 3 queues), which is much more feasible.

It should be noted that in the other two priority queues (108; 112), which are ordered in reverse with the smallest element on top, the adjustment process will go downstream, but again stay within one branch and adjacent elements, as will be clear to one of ordinary skill in the art.

Finally, in FIGS. 6A-6C, the element whose priority changed (604) happened to be at the bottom of the tree representing the priority queue (600). In general, the element can be anywhere within the queue (600), and the process will always start from the changed element (604) upstream or downstream, depending on the priority queue (108; 110; 112) in which the element is located. As was described above, it is important to keep position references current when elements are swapped in the priority queues (108; 110; 112).

Returning again to FIG. 3, after adjusting the record position (step 306), the process continues to step 308 and returns the "Dominant" indicator. If it were determined in step 304 that the record is not in the top/in-cache priority queue (108), then the process adjusts the record positions in the two not-in-cache priority queues (110; 112) (step 310) in the same manner that was discussed above with reference to FIGS. 6A-6C. The process then examines whether the element should be moved over to the top/in-cache priority queue (108) (step 312). This step will now be explained in greater detail with reference to FIG. 7.

Figure 7:
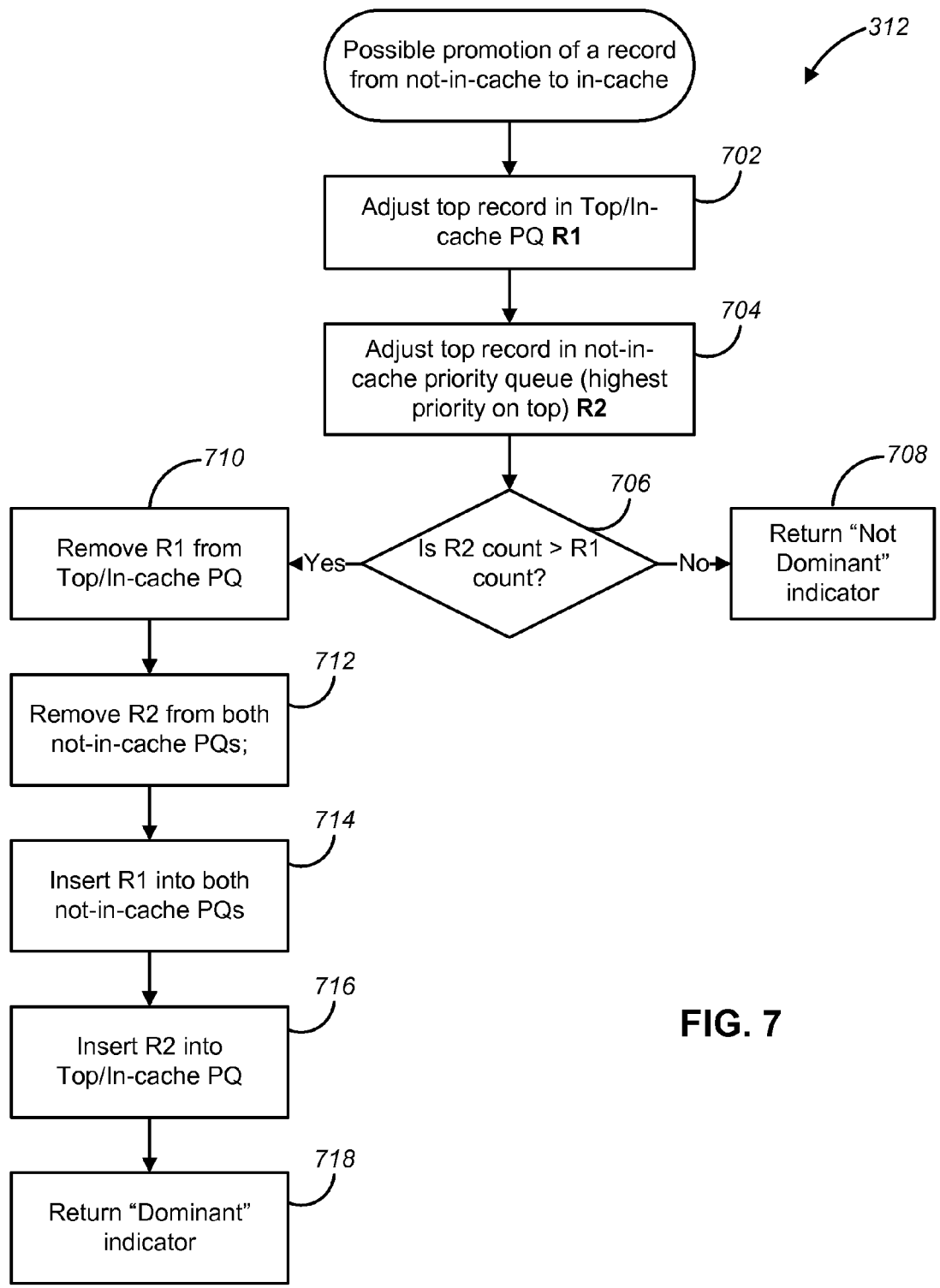
FIG. 7 is a flowchart showing how a query record is moved between priority queues in accordance with some embodiments.

As can be seen in FIG. 7, in one implementation the process (312) for possible promotion of a record from the not-in-cache priority queue (110) to the top/in-cache priority queue (108) starts with adjusting the count of the top record in the top/in-cache priority queue (108), that is, the record with the lowest count (step 702). The adjustment of the count is made in the manner that was described above with reference to FIG. 5. This adjusted record in the top/in-cache priority queue (108) is hereinafter referred to as R1.

Next, the count of the top record in the not-in-cache priority queue (110) is adjusted, that is, the record with the highest count in the not-in-cache priority queue (110) (step 704). Again, the adjustment of the count is made in the manner that was described above with reference to FIG. 5. This adjusted record is hereinafter referred to as R2.

The process then checks whether the R2 count is larger than the R1 count (step 706). If the R2 count is not larger than the R1 count, the R2 record does not need to be promoted from the not-in-cache priority queue (110) to the top/in-cache priority queue (108), and the process ends by returning "Not Dominant" (step 708). However, if the check in step 706 shows that the R2 count is indeed larger than the R1 count, then the process removes the R1 record from the top/in-cache priority queue (108) (step 710), removes the R2 record from both of the not-in-cache priority queues (110; 112) (step 712), inserts the R1 record into both the not-in-cache priority queues (110; 112) (step 714), and inserts the R2 record into the top/in-cache priority queue (108) (step 716). Finally the process returns "Dominant" (step 718), which concludes the promotion process shown in FIG. 7, as well as the processing of a known record shown in FIG. 3.

Processing of a New Record

Figure 4:
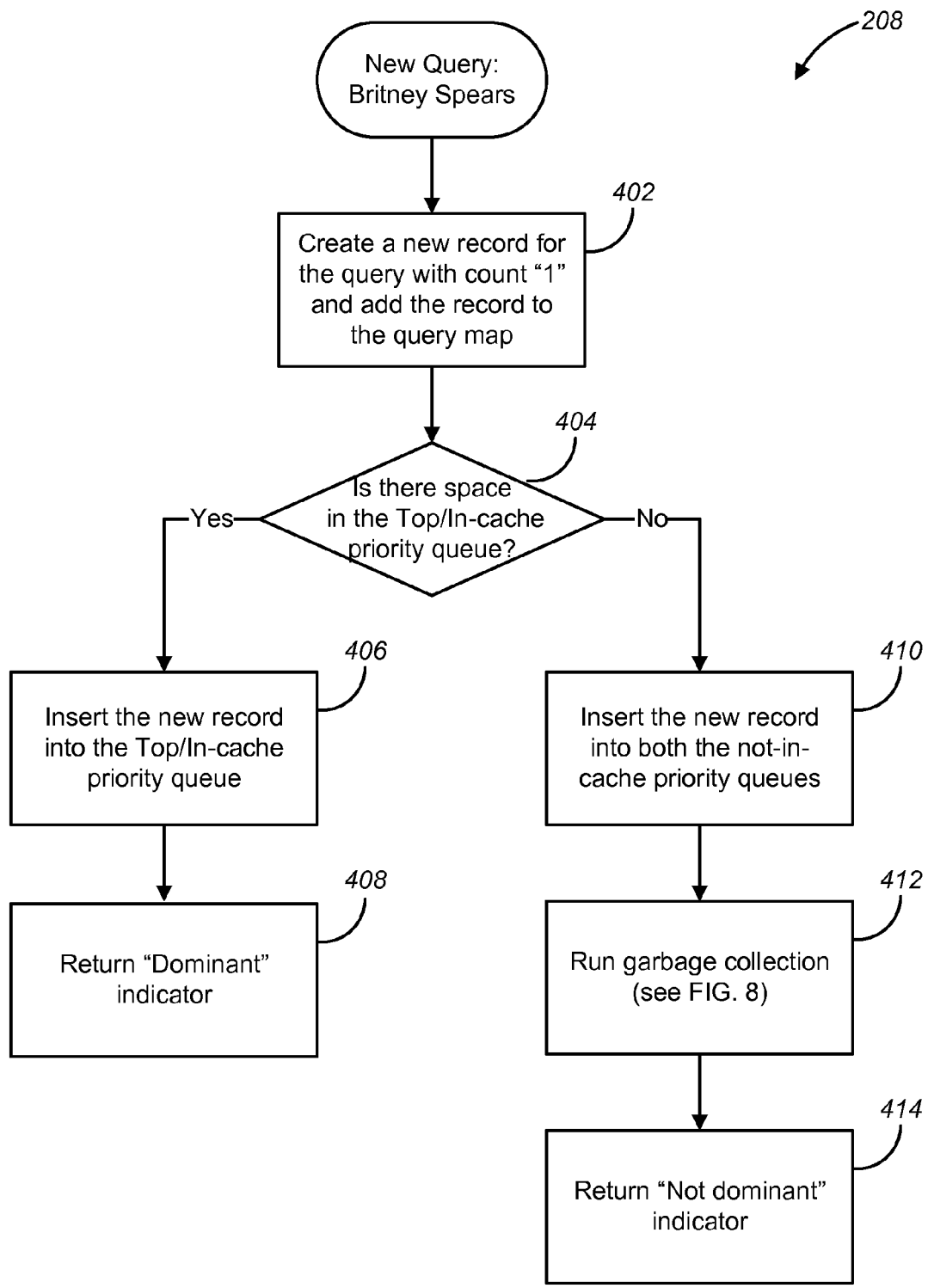
FIG. 4 is a flowchart showing how a new record is processed in accordance with some embodiments.

Returning now to FIG. 2, if it is determined in step 204 that the query is not in the query map (104), then the query is processed as a new record (step 208), which will now be described with reference to FIG. 4. As can be seen in FIG. 4, the processing of a new record starts by creating a new record for the query "Britney Spears" with the count "1" (or some other arbitrary number larger than zero) (step 402) and inserting this new record into the query map (104). Next, the process checks whether there is space in the top/in-cache priority queue (108) (step 404). It should be noted that the maximal size of the top/in-cache priority queue (108) is predetermined, for example, on the basis of the cache size desired. Generally, in using this method, it is decided initially how many "dominant" events should be identified, and then the top/in-cache priority queue (108) is kept within this size. For the search results in-memory cache specifically, a reasonable number of "dominant" events can be in the range of tens of thousands to hundreds of thousands of entries. If there is space in the top/in-cache priority queue (108), then the process inserts the new record into the top/in-cache priority queue (step 406). It should be noted that insertion of an element into a priority queue, such as the top/in-cache priority queue (108) is a standard well-known process. However, the position reference in the records affected by the insertion process must also be corrected. The details of these position adjustments are similar to those described above with reference to FIGS. 6A-6C and will be clear to those of ordinary skill in the art. The process then returns a "Dominant" indicator (step 408), which ends the process.

If it is determined in step 404 that there is no space in the top/in-cache priority queue (108), then the process proceeds by inserting the new record into the two not-in-cache priority queues (110; 112) (step 410). It should again be noted that the position references in the affected records must be updated. The process then runs the garbage collection process (step 412), which will be explained below with reference to FIG. 8, and returns a "Not Dominant" indicator (step 414), which ends the process.

Garbage Collection

Figure 8:
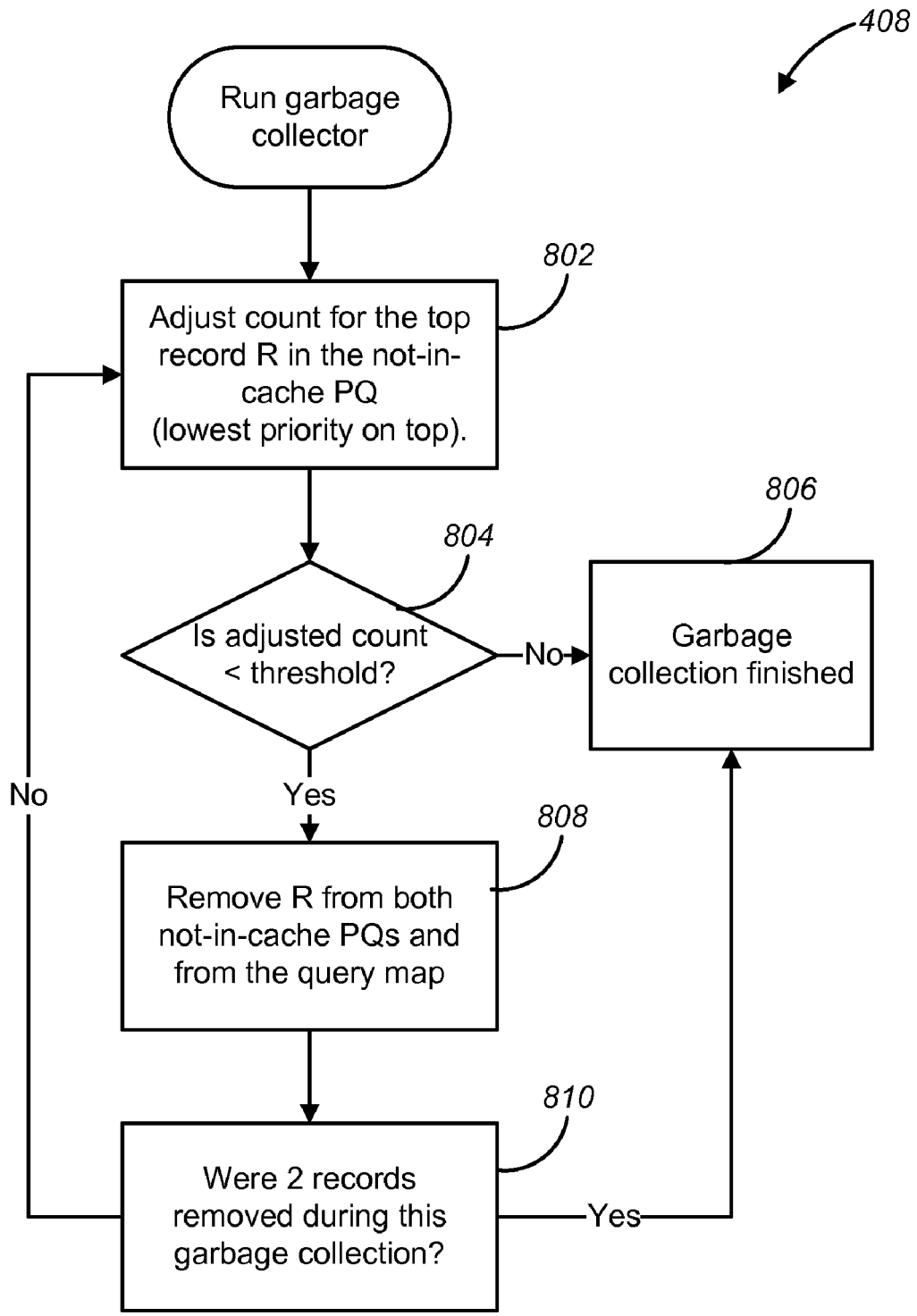
FIG. 8 is a flowchart showing a garbage collection procedure for infrequently used priority queue elements in accordance with some embodiments.

As the skilled person realizes, the query record map (104) and the not-in-cache priority queues (110; 112) typically would get filled up with non-popular queries unless they were regularly maintained. For this purpose, various embodiments include a garbage collection process, which is outlined in FIG. 8. As can be seen in FIG. 8, the garbage collection process starts by adjusting the count for the top record R in the not-in-cache priority queue with the lowest priority on top (112) (step 802). The process then checks whether the adjusted count is less than a predetermined threshold value (step 804). In some embodiments, this threshold value is determined according to two considerations. Defining a threshold value that as too small leads to excessive growth of the not-in-cache priority queues (110; 112) and the query map (104); whereas defining a threshold value that is too large does not allow for adequate history to be taken into account. In determining the threshold value, specifics of the actual application that uses the method for identifying the dominant events should be considered, as well as the discount factor Df and the time interval Ti in FIG. 5. For example, for search engine searches, if a query is not seen for 15 or more minutes, it might be reasonable to stop keeping track of the query. Thus, for the sample values of Ti and Df in FIG. 5, a threshold value of 0.03 or so would seem reasonable.

If the adjusted count is not less than the threshold value, then no garbage collection is necessary and the process finishes (step 806). Expressed differently, this means that all the queries in the priority queues (108; 110; 112) are still frequent/relevant enough. In terms of the maximum number of elements in the not-in-cache priority queues (110; 112) and the query map (104), using the above example numbers (Df=3.1415926, Ti=5 minutes, and the threshold=0.03), the policy would guarantee that the size of these not-in-cache priority queues (110; 112) and the query map (104) would never exceed the total number of distinct queries seen in any 20-minute period, which is a reasonable number, and will actually be somewhat smaller.

If it is determined in step 804 that the adjusted count is less than the threshold value, then the record is removed from the two not-in-cache priority queues (110; 112) and the query map (104) (step 808). The process then checks whether two records were already removed during the garbage collection, i.e., that two iterations were made (step 810). If two records were removed, then the process ends (step 806), and if two records were not removed, then the garbage collection process returns to step 802 and is run again. The reason that record removal is limited to two records at a time in this exemplary embodiment is to avoid latency spikes when many records fall below the threshold value simultaneously. In this scheme, if many records fall below the threshold value, the records will eventually be removed (as two records are removed whenever one record is inserted). However, any individual operation remains fast. This ensures that the two not-in-cache priority queues (110; 112) remain reasonable in size. It should be noted that the two not-in-cache priority queues (110; 112) and the query map (104) typically are considerably larger than the top/in-cache priority queue (108).

In other embodiments, the two not-in-cache priority queues (110; 112) can have a fixed size and the garbage collection can be as easy as discarding the top element in the second not-in-cache priority queue (112) (that is, the least popular element) whenever a new query element is inserted, which results in the size of the not-in-cache priority queue (112) exceeding the fixed size. In yet other embodiments, the garbage collection can run as a separate process, rather than as a part of query processing.

The three priority queues (108; 110; 112) and the query map (104) are typically located in a random access memory (RAM) of a computer system. However, implementations are also possible where the two not-in-cache priority queues (110; 112) are located on some kind of slower access memory, such as a hard disk. Furthermore, the actual cached records referred to by the priority queues can be located in a slower memory, such as a hard disk.

Implementations and Variants

The various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. The various embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various embodiments can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

A number of implementations have been described. Nevertheless, it will be understood that various modifications may be made. For example, while the embodiments have been described above in the context of web queries, it should be noted that there are several other events that essentially fall under the same model, such as click-through rates, purchases, traffic patterns for geographic regions and so on. In some implementations, the events can be grouped based on what clients are responsible for the events and be tracked by various client identifiers, such as IP addresses, cookies, and so on. Tracking client identifiers rather than individual events makes it possible to determine which clients are currently dominating ones and can be advantageous for various purposes. For example, if a denial of service attack occurs, it is possible to know what client dominates, and selectively block that client.

The embodiments have also been described in the context of efficient caching, but as the skilled reader realizes, knowing what the most popular events are can also be used for other purposes, such as promoting currently popular advertisements or products and dynamically adjusting the price of products based on their current popularity. The various embodiments can also be used for identifying automated clients keeping track of clients that issue, over time, a disproportionately high number of requests. In general, the various embodiments can be used for any purposes in which business decisions can be made based on identification of currently popular events. Accordingly, other embodiments are within the scope of the following claims.

The invention claimed is:

1. A computer-implemented method for caching currently dominant computer network events in a computer system, the computer system including a computer network and a plurality of computers connected by the computer network, the method comprising:
monitoring live computer network traffic on the computer network, the live computer network traffic including a plurality of current events in the computer system;
selecting a subset of the monitored events;
creating an event record for each event in the subset of monitored events, the event records including a timestamp T' indicating the most recent time an event record was adjusted, the event records further including a count N' indicating a popularity of an event at the time the event record was most recently adjusted, the count being generated through applying the following mathematical formula:

$$N'=N/Df^{(T'-T)/Ti}$$

where Ti is a discount-time interval, Df is a discount factor that is applied after time Ti, N is a previous count, and T is a previous timestamp indicating the last time the event record was adjusted;
assigning priorities to the events in the subset of monitored events at least in part based on the counts in the event records; and
caching a first set of priorities in a first priority queue in a cache on one or more computers, the first set of priorities identifying the currently dominant events in the subset of monitored events.

2. The method of claim 1, wherein the computer network is selected from one or more of: an intranet and the Internet.

3. The method of claim 1, wherein the events are one or more of:
queries, advertisement selections, user/client actions.

4. The method of claim 3, wherein the events have a client identifier selected from one or more of: a client IP address, a cookie, and a user identifier.

5. The method of claim 1, further comprising:
storing a second set of priorities in a second priority queue, the second set of priorities identifying a set of events that are not currently dominant events.

6. The method of claim 5, further comprising:
transferring the highest priority from the second priority queue to the first priority queue when the priority in the second priority queue is higher than the lowest priority in the first priority queue; and
transferring the lowest priority from the first priority queue to the second priority queue when a priority from the second priority queue is transferred to the first priority queue.

7. The method of claim 5, further comprising:
storing in a third priority queue a reverse representation of the priorities in the second priority queue; and
using the reverse representation in the third priority queue for garbage collection of infrequently used priorities in the second priority queue.

8. The method of claim 7, wherein each of the caching and assigning the third set of priorities is an operation of O(log N), where N is the number of elements in the third priority queue.

9. The method of claim 5, wherein each of the storing and assigning the second set of priorities is an operation of O(log N), where N is the number of elements in the second priority queue.

10. The method of claim 1, wherein the number of events in the subset of events is in the order of O(log N), where N is the number of elements in the first priority queue.

11. The method of claim 1, wherein each of the storing and assigning the first set of priorities is an operation of O(log N), where N is the number of elements in the first priority queue.

12. The method of claim 1, wherein the first priority queue is selected from the group consisting of: a tree-based implementation and a heap-based implementation.

13. The method of claim 1, wherein the first priority queue supports operations including one or more of: inserting an arbitrary element at any position within the first priority queue, adjusting of the position of an arbitrary element located at any position within the first priority queue, and removing an arbitrary element located at any position within the first priority queue.

14. A computer program product, stored on a non-transitory machine-readable medium, for caching currently dominant computer network events in a computer system, the computer system including a computer network and a plurality of computers connected by the computer network, comprising instructions operable to cause a computer to:
monitor live computer network traffic on the computer network, the live computer network traffic including a plurality of current events in the computer system;
select a subset of the monitored events;
create an event record for each event in the subset of monitored events, the event records including a timestamp T' indicating the most recent time an event record was adjusted, the event records further including a count N' indicating a popularity of an event at the time the event record was most recently adjusted, the count being generated through applying the following mathematical formula:

$$N'=N/Df^{T'-T)/Ti}$$

where Ti is a discount-time interval, Df is a discount factor that is applied after time Ti, N is a previous count, and T is a previous timestamp indicating the last time the event record was adjusted;
assign priorities to the events in the subset of monitored events at least in part based on the counts in the event records; and
cache a first set of priorities in a first priority queue in a cache on one or more computers, the first set of priorities identifying the currently dominant events in the subset of monitored events.

15. A system for caching currently dominant computer network events in a computer system, comprising:
a plurality of computers;
a computer network connecting the plurality of computers; and
a central processor operable to execute instructions stored in a memory to perform the following functions:
monitoring live computer network traffic on the computer network, the live computer network traffic including a plurality of current events in the computer system;
selecting a subset of the monitored events;
creating an event record for each event in the subset of monitored events, the event records including a timestamp T' indicating the most recent time an event record was adjusted, the event records further including a count N' indicating a popularity of an event at the time the event record was most recently adjusted, the count being generated through applying the following mathematical formula:

$$N'=N/Df^{T'-T)/Ti}$$

where Ti is a discount-time interval, Df is a discount factor that is applied after time Ti, N is a previous count, and T is a previous timestamp indicating the last time the event record was adjusted;
assigning priorities to the events in the subset of monitored events at least in part based on the counts in the event records; and
caching a first set of priorities in a first priority queue in a cache on one or more computers, the first set of priorities identifying the currently dominant events in the subset of monitored events.

* * * * *